United States Patent Office 3,438,973
Patented Apr. 15, 1969

3,438,973
2,2- AND 3,3-HYDRAZI-STEROIDS OF THE ANDROSTANE AND PREGNANE SERIES
Robert Fitz Randolph Church, Old Greenwich, Conn., Andrew Steven Kende, Hartsdale, N.Y., and Martin Joseph Weiss, Oradell, N.J., assignors to American Cyanamid Company, Stamford, Conn., a corporation of Maine
No Drawing. Filed Aug. 25, 1964, Ser. No. 392,022
Int. Cl. C07c *173/10, 169/34, 169/20*
U.S. Cl. 260—239.5                            7 Claims This invention relates to new steroid compounds. More particularly it relates to 2,2 and 3,3-hydrazi and 2,2- and 3,3-azo substituted steroids of the androstane and pregnane series.

The novel steroids of the present invention may be illustrated by the following formula:

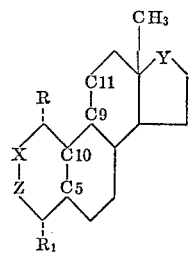

wherein R and $R_1$ are selected from the group consisting of hydrogen and lower alkyl; X is selected from the group

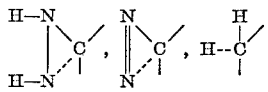

and

Y is selected from the group consisting of

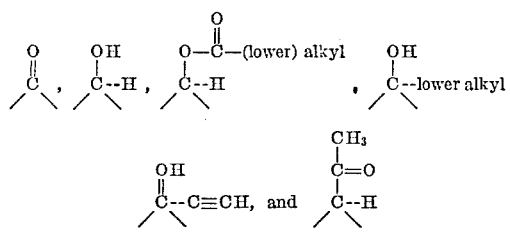

Z is selected from the group consisting of

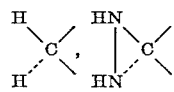

and

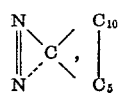

is selected from the group consisting of

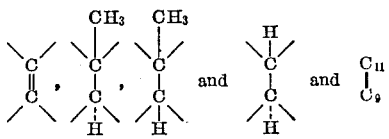

is selected from the group consisting of

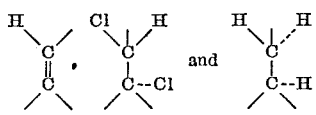

with the proviso that two and only two nitrogen atoms are present.

The compounds of the present invention are in general crystalline solids. They are somewhat soluble in the usual organic solvents and substantially insoluble in water.

The present compounds are prepared by treating a 2- or 3-keto steroids with ammonia preferably in the presence of a solvent such as an alcohol and subsequently with hydroxylamine O-sulfonic acid or chloramine to produce the corresponding 2,2- or 3,3-hydrazi steroids. The reaction is preferably carried out at a temperature of 40° C. (preferably below 20° C.) to a lower limit dependent on the freezing point of the solvent. Solvents such as alcohols, water and liquid ammonia have been found useful in the process. The process will take place in a period of from a few minutes to about 6 hours. The reaction, when carried out under the above conditions, will take place preferentially at the 2- or 3-keto group in the presence of a ketone group at the 17 or 20-position.

The 2,2- and 3,3-azo steroids of this invention are prepared by the oxidation of the 2,2- and 3,3-hydrazi steroids. An oxidation reagent such as, for example, silver oxide can be used as a methanolic suspension. The oxidation is preferably carried out at about room temperature although the temperature may vary from about —10° C. to 60° C. The following equations are representative of the reactions which take place:

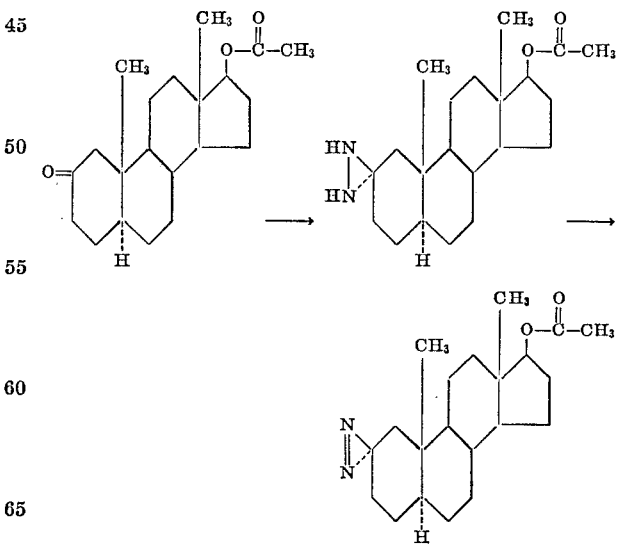

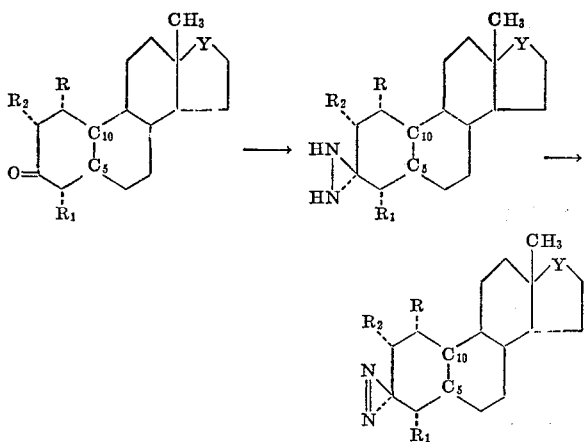

wherein Y, $$C_{10} \atop C_5$$

and R and $R_1$ are as hereinbefore defined and $R_2$ is hydrogen and lower alkyl.

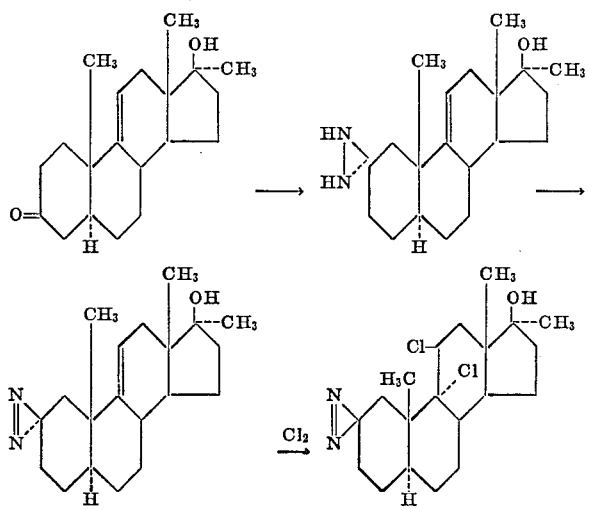

The new compounds of the androstane series of the present invention are particularly useful as androgenic and anabolic agents. They are potentially useful in androgenic replacement therapy, in supportive therapy for patients suffering from debilitating diseases and in the treatment of post-operative trauma. Those steroids having a 17-alpha alkyl group are effective when administered orally. The new compounds of the pregnane series of the present invention possess progestational activity and are useful in place of known progestational steroids such as progesterone in the treatment, for example, of habitual abortion by administering in a similar type of parenteral preparation as progesterone with the activity of the particular compound determining the dosage used.

The following examples illustrate in greater particularity the preparation of representative 2,2- and 3,3-hydrazi and 2,2- and 3,3-azo steroids of the present invention.

EXAMPLE 1

Preparation of 3,3-hydrazi-5α-androstan-17β-ol acetate

A magnetically stirred solution of 2.0 g. 5α-dihydrotestosterone acetate in 75 ml. methanol is cooled to 0° and saturated with ammonia at 2°±2° C. After saturation with ammonia, the solution is stirred a further 10 minutes and 1.0 g. hydroxylamino-O-sulfonic acid is added in portions during a 10 minute period. The resulting mixture is stirred 5½ hours at 2°±2° and poured slowly into 400 ml. water. The aqueous mixture is extracted with ether (4× 50 ml.), the ethereal extracts combined, washed with water and saturated aqueous chloride, and dried over sodium sulfate. After filtration, the ether is evaporated at reduced pressure and the residue is chromatographed on 80 g. silica gel. The product (1.416 g.) is eluted with 1:1 methanol-in-ether. Recrystallization from methylene chloride-hexane yields 682 mg. glistening platelets, melting point 141–143° C. (dec.).

EXAMPLE 2

Preparation of 3,3-azo-5α-androstan-17β-ol acetate

To a magnetically stirred solution of 160 mg. (0.47 mmole) 3,3 - hydrazi - 5α-androstan-17β-ol acetate (Example 1) in a mixture of 1.3 ml. 0.59 M aqueous silver nitrate (0.75 mmole) and 40 ml. methanol at room temperature is added dropwise 0.8 ml. 0.92 M aqueous sodium hydroxide (0.75 mmole) during a 5 minute period. The resulting mixture is stirred 1¼ hours at room temperature and filtered through diatomaceous earth. The filtrate is evaporated at reduced pressure to approximately 15 ml. and diluted with 100 ml. ice water. The resulting mixture is extracted with ether (4 portions), the ethereal extracts combined, washed with water, saturated aqueous sodium chloride, dried over sodium sulfate, and evaporated at reduced pressure to afford 157 mg. crystalline solid, melting point 120–128° C. (dec.). Recrystallization from hexane affords a sample with melting point 154°–156° C. (dec.).

EXAMPLE 3

Preparation of 3,3-hydrazi-5α-androstan-17β-ol

A solution of 1.066 g. 5α-dihydrotestosterone in 30 ml. methanol saturated at 0° C. with ammonia is stirred 15 minutes and 1.020 g. hydroxylamino-O-sulfonic acid added over a 4 minute period. The resulting mixture is stirred 2 hours, diluted with 100 ml. ice water and extracted with 4 portions of methylene chloride. The extracts are combined, washed with water and saturated aqueous sodium chloride, dried over sodium sulfate, and evaporated at reduced pressure. The residue is dissolved in methylene chloride-benzene and chromatographed on 50 g. silica gel. After elution with ether, the product (422 mg.) is eluted with 1:4 methanol:ether and recrystallized from ethyl acetate-hexane to melting point 149°–151° C. (dec.).

EXAMPLE 4

Preparation of 17α-methyl-3,3-hydrazi-5α-androstan-17-ol

Methanol (150 ml.) is saturated at 10° C. with ammonia and 4.5 g. 17α-methyl-5α-androstan-17β-ol added. The reuslting solution is stirred in ice salt for 15 minutes, with the temperature at —2° C. Hydroxylamino-O-sulfonic acid (3.8 g.) is added in portions over a 5 minute period and the mixture is stirred 2½ hours at 0°. The mixture is diluted with 1500 ml. ice water and extracted into methylene chloride, then ether. The combined extracts are washed with saturated aqueous sodium chloride, dried over sodium sulfate and evaporated at reduced pressure. The residue is chromatographed on silica gel. After elution with ether, elution with 1:9 methanol-ether yields the product, recrystallized from acetone-hexane to melting point 167°–170° C. (dec.).

EXAMPLE 5

Preparation of 17α-methyl-3,3-azo-5α-androstan 17β-ol

To a magnetically stirred solution of 1.7 g. crude 17α-methyl - 3,3-hydrazi-5α-androstan-17β-ol (Example 4) in 100 ml. methanol is added a solution of 3.4 g. silver nitrate in 15 ml. water and, dropwise during 30 minutes, a solution of 0.8 g. sodium hydroxide in 20 ml. methanol. The mixture is stirred 2½ hours, filtered through diatomaceous earth and diluted with 800 ml. water. The product is isolated in methylene chloride, and the solvent removed at reduced pressure. Chromatography on silica gel (elution with 2% ether-in-benzene) affords the product, recrystallized from acetone-hexane to melting point 153°–154° C. (dec.).

EXAMPLE 6

Preparation of 17α-ethyl-5α-estran-17β-ol-3-one

To a magnetically stirred solution of 210 mg. lithium in 200 ml. anhydrous liquid ammonia is added dropwise a solution of 2.82 g. 17α-ethylestr-4-en-17β-ol-3-one in 25 ml. peroxide-free tetrahydrofuran. The solution is stirred ½ hour and ammonium chloride is added to discharge the color. The ammonia is evaporated, 100 ml. ether and 100 ml. water are added and the layers separated. The aqueous portion is extracted once with methylene chloride, the organic portions combined, dried over sodium sulfate and evaporated at reduced pressure, and the crystalline residue is recrystallized from methanol to melting point 208°–210° C.; $\alpha_D$ +34° ($CHCl_3$).

EXAMPLE 7

Preparation of 17α-ethyl-3,3-hydrazi-5α-estran-17β-ol

Ammonia is passed through a solution of 1.060 gm. 17α-ethyl-5α-estran-17β-ol-3-one (Example 6) in 120 ml. methanol at 0° for 1 hour and then a solution of 600 mg. hydroxylamino-O-sulfonic acid in 6 ml. methanol added dropwise. The mixture is stirred a further ½ hour at 0°, warmed slowly to room temperature, diluted with 500 ml. water and the product isolated in methylene chloride. After removal of the solvent at reduced pressure, the product is chromatographed on 50 g. silica gel. Elution with 1:4 methanol-ether affords the product, melting point 82°–87° C.; $\alpha_D$ +13.7° ($CHCl_3$).

EXAMPLE 8

Preparation of 17α-ethyl-3,3-azo-5α-estran-17β-ol

To a solution of 108 mg. 17α-ethyl-3,3-hydrazi-5α-estran-17β-ol (Example 7) in 30 ml. methanol is added 1 ml. 1 N aqueous silver nitrate. One ml. 1 N methanolic sodium hydroxide is added dropwise with stirring and the resulting mixture stirred 2½ hours at ambient temperature. The mixture is filtered through diatomaceous earth, the filtrate is diluted with water and the product is isolated with methylene chloride. After evaporation of the solvent at reduced pressure the residue is chromatographed on 6 gm. silica gel. Elution with 2% ether-in-benzene affords the product, recrystallized from petroleum ether to melting point 106–108° C.; $\alpha_D$ +24.6° ($CHCl_3$).

EXAMPLE 9

Preparation of 5β-androstane-3,17-dione

To a solution of 1.54 g. 5β-androstan-3α-ol-17-one in 100 ml. acetone at 0° is added dropwise 1.280 ml. 8 N chromium trioxide in sulfuric acid (2 molar equivalents). The resulting mixture is diluted with 350 ml. ice water, stirred 1 hour and filtered. Recrystallization from acetone-hexane yields 1.392 gms. product, melting point 118°–120° C.; $\alpha_D$ +76° ($CHCl_3$).

EXAMPLE 10

Preparation of 3,3-hydrazi-5β-androstan-17-one

To 100 ml. saturated methanolic ammonia at 0° is added 1.320 g. 5β-androstane-3,17-dione (Example 9) and the solution is stiarred ½ hour at 0°. Hydroxylamine-O-sulfonic acid (600 mg., 1.15 molar equivalents) is added in portions over about 5 minutes and the mixture is stirred at 0° to −5° C. for ½ hour. The mixture is diluted with 900 ml. water and extracted into methylene chloride. After drying the solution, the methylene chloride is evaporated at reduced pressure and the residue chromatographed on 50 g. silica gel. Elution with 1:4 methanol: ether affords the product (784 mg.) recrystallized from acetone-hexane to melting point 150°–152° C.; $\alpha_D$ +112° ($CHCl_3$).

EXAMPLE 11

Preparation of 17α-methyl-5β-androstane-3β,17β-diol

A 3 M solution of methyl magnesium bromide in ether (60 ml.) is added during a 5 minute period to a solution of 3.71 gm. 5β-androstane-3β-ol-17-one in 100 ml. dry ether. The mixture is refluxed gently for 2½ hours and poured into 500 ml. cold saturated aqueous ammonium chloride. The layers are separated, the aqueous layer is extracted with ether and the ethereal extracts combined, washed with saturated aqueous sodium chloride and dried over sodium sulfate. The solvent is removed at reduced pressure. After trituration with ether the crystalline product (3.36 g.) is collected, melting point 170°–177° C. Recrystallization from ethyl acetate hexane affords white crystals, melting point 180°–181° C.; $\alpha_D$ −10° ($CHCl_3$).

EXAMPLE 12

Preparation of 17α-methyl-5β-androstan-17β-ol-3-one

An 8 N aqueous chromic acid solution (2.35 ml., 18.8 milliequivalents) is added dropwise to a stirred, ice-cold solution of 2.86 g. (9.4 millimoles) 17α-methyl-5β-androstane-3β,17β-diol (Example 11) in 200 ml. acetone. The resulting mixture is diluted with 900 ml. water and extracted into ether. After drying the ethereal solution, the solvent is removed at reduced pressure. The oily residue is chromatographed on alumina. 1:4 Ether:benzene elutes 2.2 g. product, recrystallized from acetone-hexane to melting point 82°–85° C.; $\alpha_D$ +6.15° ($CHCl_3$).

EXAMPLE 13

Preparation of 17α-methyl-3,3-hydrazi-5β-androstan-17β-ol

Methanol (50 ml.) is saturated at 0° with ammonia and 1.201 g. 17α-methyl-5β-androstane-17β-ol-3-one (Example 12) added. The solution is stirred ½ hour at 0°. Hydroxylamino-O-sulfonic acid (2.0 g.) is added in portions and the resulting mixture stirred 2½ hours at 0° to 10° C. and diluted with 300 ml. water. The precipitated product is isolated in methylene chloride. After removal of the solvent at reduced pressure, the residue is chromatographed on 50 g. silica gel. Methanol:ether (1:9) affords 590 mg. product.

EXAMPLE 14

Preparation of 17α-methyl-3,3-azo-5β-androstan-17β-ol

To a magnetically stirred solution of 472 mg. 17α-methyl-3,3-hydrazi-5β-androstan-17β-ol (Example 13) and 4 ml. 1 N aqueous silver nitrate in 100 ml. methanol is added dropwise 1.65 ml. 2.5 N aqueous sodium hydroxide. The mixture is stirred 2 hours at room temperature, filtered through diatomaceous earth and the filtrate partially evaporated at reduced pressure. The residue is diluted with 250 ml. water and extracted into methylene chloride. After drying the combined extracts, the solvent is removed at reduced pressure giving 433 mg. oil. The oil is chromatographed on alumina. Elution with 5% ether-in-benzene yields 293 mg. crystalline product, recrystallized from hexane to melting point 118°–120° C. (dec.), $\alpha_D$ +2° ($CHCl_3$).

EXAMPLE 15

Preparation of 3,3-hydrazi-5α-pregnan-20-one

Methanol (160 ml.) is saturated with ammonia at 5° C. and 3.036 g. 5α-dihydroprogesterone is added. The mixture is stirred 1 hour at 5°±2° C. and 2.8 g. hydroxylamine-O-sulfonic acid is added in small portions over a 5 minute period. The mixture is stirred 1½ hour at 0±3° and allowed to warm to room temperature, diluted with 800 ml. of water and extracted into methylene chloride. After drying the combined extracts, the solvent is removed at reduced pressure and the residue chromatographed on

EXAMPLE 16

Preparation of 3,3-azo-5α-pregnan-20-one

To a solution of 352 mg. 3,3-hydrazi-5α-pregnan-20-one (Example 15) and 2 ml. 1 N aqueous silver nitrate in 50 ml. methanol is added dropwise with stirring 2 ml. 1 N methanolic sodium hydroxide. The mixture is stirred 17 hours and filtered through diatomaceous earth. The filtrate is evaporated at reduced pressure to about 10 ml., diluted with 100 ml. water, and the precipitate is filtered. The precipitate is dissolved in methylene chloride and dried over sodium sulfate. The solvent is removed at reduced pressure and the crystalline residue (356 mg.) is chromatographed on 20 g. silica gel. Elution with benzene affords 257 mg. crystalline product, recrystallized from acetone-hexane; melting point 141°–143° C. (dec.), $\alpha_D$ +101° (CHCl$_3$).

EXAMPLE 17

Preparation of 2α,17α-dimethyl-3,3-hydrazi-5α-androstan-17β-ol

Methanol (80 ml.) is saturated at 2°±2° C. with ammonia and a solution of 2.0 g. 2α,17α-dimethyl-5α-androstan-17β-ol-3-one [H. J. Ringold et al., J. Amer. Chem. Soc., 81, 427 (1959)] in 40 ml. methanol is added. Ammonia addition is continued for 15 minutes with ice-salt cooling and 2.0 gm. hydroxylamine-O-sulfonic acid is added in portions over a 30 minute period with stirring. The mixture is stirred 2 hours at 2±2° and allowed to warm to ambient temperature. Dilution with 500 ml. water, followed by isolation in methylene chloride and evaporation of the solvent at reduced pressure yields 2.206 g. crude product. Chromatography on 100 g. silica gel yields 770 mg. product.

EXAMPLE 18

Preparation of 2α,17α-dimethyl-3,3-azo-5α-androstan-17β-ol

To a magnetically stirred solution of 420 mg. 2α,17α-dimethyl-3,3-hydrazi-5α-androstan-17β-ol (Example 17) and 5 ml. 1 N aqueous silver nitrate in 60 ml. methanol is added dropwise 2 ml. 2.5 N aqueous sodium hydroxide. The mixture is stirred ½ hour, filtered through diatomaceous earth, evaporated at reduced pressure to approximately 15 ml., and diluted with 150 ml. water. The product is isolated in methylene chloride, the solvent evaporated and the residue chromatographed on 20 g. silica gel. Ether:benzene (1:20) elutes 242 mg. crystalline product, recrystallized from methylene chloride-hexane to melting point 117°–118° C. (dec.), $\alpha_D$ +4° (CHCl$_3$).

EXAMPLE 19

Preparation of 2,2-hydrazi-5α-androstan-17β-ol acetate

A solution of 462 mg. 5α-androstan-17β-ol-2-one acetate [R. L. Clarke, Jour. Orgn. Chem., 28, 2626 (1963)] in 45 ml. methanol is saturated with ammonia while cooling in an ice-salt bath. After 1½ hours the temperature drops to 0° C. A slow addition of ammonia is continued for 3 hours, maintaining the internal temperature at 0°. Hydroxylamino-O-sulfonic acid (620 mg.) is added rapidly in small portions with stirring at 0° and the resulting solution is stirred 1½ hours at 0°. The solution is diluted with 600 ml. saturated aqueous sodium chloride and stirred ½ hour. The resulting precipitate is filtered, dissolved in methylene chloride, dried over sodium sulfate and the solvent evaporated at reduced pressure. The residue (423 mg.) is crystalline.

EXAMPLE 20

Preparation of 2,2-azo-5α-androstan-17β-ol acetate

To a solution of 423 mg. crude 2,2-hydrazi-5α-androstan-17β-ol acetate (Example 19) in 50 ml methanol is added 2.5 ml. 1 N aqueous silver nitrate. The solution is stirred magnetically and 1 ml. 2.5 N aqueous sodium hydroxide is added dropwise. The resulting mixture is stirred 2 hours and filtered through diatomaceous earth. The filtrate is evaporated at reduced pressure to about 10–20 ml. and diluted with 200 ml. water. The aqueous mixture is stirred 15 minutes and the resulting precipitate is filtered, washed with water, dissolved in a minimum amount of benzene, dried over sodium sulfate, and an equal volume of 30–60° petroleum ether is added. This solution is adsorbed on a column of 25 g. silica gel. Benzene elutes 91 mg. product, recrystallized from methylene chloride-hexane to melting point 153°–155° (dec.).

EXAMPLE 21

Preparation of 3,3-hydrazi-1α-methyl-5α-androstan-17β-ol acetate

A solution of 162 mg. 1α-methyl-5α-androstan-17β-ol-3-one-acetate [German Patent 1,131,667 (1962)] in 40 ml. methanol is cooled in ice salt while saturating with ammonia. The solution is held at 0°±3° for 3½ hours continuing a slow addition of ammonia. Hydroxylamino-O-sulfonic acid (500 mg.) is added in portions with magnetic stirring and after 45 minutes at 0°±3°, the mixture is diluted with 300 ml. ice water. The product is isolated in methylene chloride, and the solvent is removed at reduced pressure to afford a crystalline residue (162 mg.).

EXAMPLE 22

Preparation of 3,3-azo-1α-methyl-5α-androstan-17β-ol acetate

To a solution of 118 mg. crude 3,3-hydrazi-1α-methyl-5α-androstan-17β-ol acetate (Example 21) and 1 ml. 1 N aqueous silver nitrate in 40 ml. methanol is added dropwise 0.4 ml. 2.5 N aqueous sodium hydroxide and the resulting mixture is stirred 1¼ hours. After filtration of the mixture through diatomaceous earth the filtrate is diluted with 300 ml. water and the product isolated in methylene chloride. The solvent is evaporated at reduced pressure and the oily residue is chromatographed on 5 g. silica gel. Benzene (200 ml.) elutes 63 mg. product, recrystallized from methanol to melting point 120°–121° C. (dec.).

EXAMPLE 23

Preparation of 17α-methyl-5α-androst-9(11)-en-17β-ol-3-one

To a magnetically stirred solution of 431 mg. lithium in 125 ml. anhydrous liquid ammonia is added a slurry of 1.921 g. 17α-methylandrosta-4,9(11)-dien-17β-3-one in 200 ml. ether. The mixture is stirred 1½ hours and approximately 10 g. ammonium chloride is added. The ammonia is evaporated and the residue is dissolved in 300 ml. water. The layers are separated, the aqueous layer is saturated with salt and extracted with ether. All organic layers are combined, washed once with saturated aqueous sodium chloride, dried over sodium sulfate, and the solvent is removed at reduced pressure.

The entire crude material (containing 3-ol as well as 3-one) is dissolved in 100 ml. acetone, cooled to 0° and 2.0 ml. 8 N aqueous chromic acid is added dropwise. The mixture is stirred at 0° for 15 minutes and diluted with 700 ml. water. After saturation of the resulting solution with salt, the product is isolated in ether. The ether is evaporated and the crystalline residue recrystallized from acetone to afford 1.14 g. product, melting point 192°–194° C.

EXAMPLE 24

Preparation of 3,3-hydrazi-17α-methyl-5α-androst-9(11)-en-17β-ol

A solution of 1.095 g. 17α-methyl-5α-androst-9(11)-en-17β-ol-3-one (Example 23) in 90 ml. methanol is treated with ammonia with ice-salt cooling. The solution is saturated at 0° after 1½ hours, and a slow stream of ammonia is maintained at 0° for 2½ hours longer. Hydroxylamino-O-sulfonic acid (1.5 gms.) is added in portions and the resultnig mixture is stirred at 0–5° for 1½ hours. The mixture is diluted with 700 ml. ice water, the solution saturated with salt, and the product extracted into methylene chloride and ether. All organic extracts are combined, dried over sodium sulfate, and the solvent evaporated at reduced pressure. The residue crystallizes on trituration in ether. Recrystallization from ethanol affords product with melting point 192–196° C. (dec.).

EXAMPLE 25

Preparation of 3,3-azo-17α-methyl-5α-androst-9(11)-en-17β-ol

To a magnetically stirred solution of 1.024 g. crude 3,3-hydrazi-17α-methyl-5α-androst-9(11)-en-17β-ol (Example 24) and 5 ml. 1 N aqueous silver nitrate in 100 ml. methanol is added dropwise 19.0 ml. 2.5 N aqueous sodium hydroxide. The resulting mixture is stirred 1¼ hours and filtered through diatomaceous earth. The filtrate is diluted with 600 ml. water and extracted with several portions of methylene chloride. The dark colored organic phases are combined, shaken with saturated aqueous sodium chloride and filtered through diatomaceous earth to remove colored impurities. The layers are separated, the organic layer is dried over sodium sulfate and the solvent is evaporated at reduced pressure. The residue chromatographed on 45 g. silica gel using 1:19 ether:benzene as eluant affords 730 mg. product, which is recrystallized from methylene chloride-hexane to melting point 142–144° C. (dec.).

EXAMPLE 26

Preparation of 3,3 - azo-9α,11β-dichloro-17α-methyl-5α-androstan-17β-ol

Chlorine is bubbled for 45 seconds through a solution of 96 mg. 3,3-azo-17α-methyl-5α-androst-9(11)-en-17β-ol (Example 25) in 0.5 ml. pyridine and 5 ml. methylene chloride. The cloudy solution is allowed to stand for 30 minutes and diluted with 15 ml. methylene chloride. The resulting precipitate is filtered off and the filtrate is washed with 10% aqueous sodium thiosulfate, 8% sulfuric acid, 10% sodium bicarbonate, dried over sodium sulfate and the solvent is removed at reduced pressure. The residue is recrystallized from acetone-hexane with activated charcoal treatment; melting point 171–174° C. (dec.).

EXAMPLE 27

Preparation of 4α,17α - dimethyl - 3,3 - hydrazi - 5α-androstan 17β - ol

A solution of 1.97 gms. 4α,17α-dimethyl-5α-androstan-17β-ol-3-one [British Patent No. 874,124 (1962)] in 80 ml. methanol is treated with ammonia over a 3 hour period while maintaining the temperature at 0°±5° C. Hydroxylamino-O-sulfonic acid (2.3 gms.) is added rapidly in portions and the mixture is stirred at 0°±5° for 1 hour. The resulting mixture is diluted with 300 ml. ice water, salt is added to saturation and the product is isolated in methylene chloride and ether. After drying the organic solution over sodium sulfate, the solvent is evaporated at reduced pressure to afford 1.57 g. solid.

EXAMPLE 28

Preparation of 3,3-azo-4α,17α-dimethyl-5α-androstan-17β-ol

To a stirred solution of 1.42 g. crude 4α,17α-dimethyl-3,3-hydrazi-5α-androstan-17β-ol (Example 27) and 10 ml. 1 N aqueous silver nitrate in 140 ml. methanol is added dropwise 4.0 ml. 2.5 N aqueous sodium hydroxide. The resulting black mixture is stirred 2 hours and filtered through diatomaceous earth. The filtrate is diluted with 500 ml. water and the product is extracted into methylene chloride. After removal of the solvent from the dried organic solution, the residue is chromatographed on 65 g. silica gel. Elution with 1:19 ether:benzene (800 ml.) affords 996 mg. product, recrystallized from cyclohexane or methanol to afford fine fibrous needles wtih melting point 139.5–141° C. (dec.).

EXAMPLE 29

Preparation of 3,3-hydrazi-estr-5(10)-en-17β-ol

Methanol (120 ml.) is cooled to 8° while saturating with ammonia and 1.468 g. estr-5(10)-en-17β-ol-3-one [U.S. Patent 2,705,721 (1955)] is added to the solution. Addition of ammonia is continued at 0±5° for 3½ hours, the solution is cooled to —5° and 1.72 g. hydroxylamino-O-sulfonic acid is added in portions. The mixture is stirred at 0°±5° C. for 1 hour and diluted with 500 ml. water. After saturation of the equeous solution with salt, it is extracted with methylene chloride in several portions. The organic extracts are combined, dried over sodium sulfate, and the solvent is evaporated at reduced pressure to give the desired product.

EXAMPLE 30

Preparation of 3,3-azo-estr-5(10)-en-17β-ol

To a solution of the crude 3,3-hydrazi-estr-5(10)-en-17β-ol (Example 29) and 8 ml. 1 N aqueous silver nitrate in 100 ml. methanol is added dropwise 3.1 ml. 2.5 N aqueous sodium hydroxide. The mixture is stirred 1½ hours and filtered through diatomaceous earth. The filtrate is diluted with 600 ml. water, and the product is isolated in methylene chloride. After removal of the solvent at reduced pressure, the residue (976 mg.) is chromatographed on 50 g. silica gel. Elution with 1:9 ether:benzene affords 210 mg. brown semi-crystalline material, recrystallized from ether-petroleum ether with activated charcoal treatment. The product is in the form of short-needles with melting point 94–97° C. (dec.)

EXAMPLE 31

Preparation of 3,3-azo-estr-5(10)-en-17β-ol acetate

A solution of 100 mg. 3,3-azo-estr-5(10)-en-17β-ol (Example 30) and 0.1 ml. acetic anhydride in 1 ml. pyridine is allowed to stand at room temperature for 18 hours. After dilution of the solution with 10 ml. water, the product is extracted into ether, the ethereal extracts are combined, washed with 4% sulfuric acid, saturated aqueous sodium bicarbonate, dried over sodium sulfate, and the solvent is evaporated at reduced pressure. The residue (143 mg.) crystallizes on trituration with petroleum ether. Recrystallization from petroleum ether affords the product, melting point 114–115° C.

EXAMPLE 32

Preparation of 3,3-azo-estr-5(10)-en-17-one

To a solution of 18 mg. 3,3-azo-estr-5(10)-en-17β-ol (Example 30) in 1 ml. dry acetone cooled to 0° is added 0.015 ml. aqueous chromic acid. The solution is stirred 15 minutes at 0° and diluted with 15 ml. ice water. The product is isolated in methylene chloride, and the solvent is evaporated at reduced pressure. The residue (liquid) is chromatographed on 2.5 g. alumina. Elution with 75 ml. 1:4 benzene:petroleum ether affords 12 mg. crystalline product, recrystallized from hexane to melting point 116–118° C.

EXAMPLE 33

Preparation of 17α-ethynyl-3,3-hydrazi-estr-5(10)-en-17-ol

Methanol (40 ml.) is saturated with ammonia at −2° and 1.002 g. 17α-ethynylestr-5(10)-en-17β-ol-3-one is added. The solution is stirred at −3±2° for 3½ hours and 650 mg. hydroxylamino-O-sulfonic acid is added in portions over a 5 minute period. The resulting mixture is stirred 1½ hours at 0±5°, diluted with 300 ml. ice water and the product isolated in methylene chloride. The solvent is removed at reduced pressure to give the desired product.

EXAMPLE 34

Preparation of 3,3-hydrazi-5α-androstan-17β-ol-acetate

A solution of chloramine in ether is prepared by cooling a mixture of ether and 5.25% aqueous sodium hypochlorite to −5° and adding cautiously with good cooling and stirring a solution of 7 ml. concentrated ammonium hydroxide in 7 ml. ice water. The solution is stirred 2 minutes, the layers are separated and the aqueous solution is extracted once with ether. All organic phases are combined, dried over calcium sulfate, and used immediately.

A solution of 500 mg. 5α-androstan-17β-ol-3-one acetate in 25 ml. methanol saturated at 0° with ammonia is stirred 15 minutes and the previously described chloramine solution is added. The resulting solution is stirred 3½ hours, evaporated at reduced pressure to about 10 ml. and diluted with 100 ml. water. The precipitate is filtered off and dried to afford the desired product.

We claim:
1. The compound 2,2-hydrazi-5α-androstan-17β-ol acetate.
2. The compound 2,2-azo-5α-androstan-17β-ol acetate.
3. The compound 3,3-hydrazi-5α-pregnan-20-one.
4. The compound 3,3-azo-5α-pregnan-20-one.
5. The compound 3,3-azo-17α-methyl-5α-androst-9(11)-en-17β-ol.
6. The compound 3,3-azo-9α,11β-dichloro-17α-methyl-5α-androstan-17β-ol.
7. The compound 3,3-azoestr-5(10)-en-17β-ol.

No references cited.

ELBERT L. ROBERTS, *Primary Examiner.*

U.S. Cl. X.R.
260—97.4, 397.45